（12）United States Patent
Petersson et al.

(10) Patent No.: US 9,865,393 B2
(45) Date of Patent: Jan. 9, 2018

(54) METALLIZED FILM CAPACITOR ELEMENT COMPRISING THERMALLY CONDUCTIVE FILMS AND A THERMALLY CONDUCTING FILM FOR AN ELECTRICAL POWER COMPONENT

(71) Applicant: ABB Technology Ltd, Zürich (CH)

(72) Inventors: Linnea Petersson, Västerås (SE); Christoph Schlegel, Baden-Dättwil (CH); Sari Laihonen, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 199 days.

(21) Appl. No.: 14/762,137

(22) PCT Filed: Feb. 1, 2013

(86) PCT No.: PCT/EP2013/052059
§ 371 (c)(1),
(2) Date: Jul. 20, 2015

(87) PCT Pub. No.: WO2014/117862
PCT Pub. Date: Aug. 7, 2014

(65) Prior Publication Data
US 2015/0318115 A1    Nov. 5, 2015

(51) Int. Cl.
*H01G 2/08*    (2006.01)
*H01G 4/32*    (2006.01)
(Continued)

(52) U.S. Cl.
CPC ............. *H01G 2/08* (2013.01); *H01G 4/012* (2013.01); *H01G 4/10* (2013.01); *H01G 4/224* (2013.01); *H01G 4/236* (2013.01); *H01G 4/32* (2013.01)

(58) Field of Classification Search
CPC  H01G 2/14; F28F 2013/005; F28F 2013/006; F28F 2013/008; B32B 5/16
(Continued)

(56) References Cited

U.S. PATENT DOCUMENTS

| | | |
|---|---|---|
| 3,483,448 A | 12/1969 | Robinson |
| 5,844,770 A | 12/1998 | Fries-Carr et al. |

(Continued)

FOREIGN PATENT DOCUMENTS

| | | |
|---|---|---|
| BE | 390 454 | 9/1932 |
| DE | 1 464 564 | 4/1969 |

*Primary Examiner* — Eric Thomas
(74) *Attorney, Agent, or Firm* — Birch, Stewart, Kolasch & Birch, LLP

(57) ABSTRACT

A metallized film capacitor element includes a plurality of concentrically arranged cylindrical sub-elements, each sub-element including at least one metal coated dielectric film wound in a plurality of turns. The capacitor element further includes one or more thermally conductive sections provided between the sub-elements. Each of the thermally conductive sections includes a sheet wound at least one turn and having a higher thermal conductivity than the metal coated dielectric film of the sub-elements. A thermally conducting film is provided for improving the thermal conductivity of electrical power components. The thermally conducting film includes an electrically insulating film and thermally conductive and electrically insulating particles disposed on at least one side of the film.

20 Claims, 2 Drawing Sheets

(51) Int. Cl.
    *H01G 4/012* (2006.01)
    *H01G 4/224* (2006.01)
    *H01G 4/236* (2006.01)
    *H01G 4/10* (2006.01)

(58) Field of Classification Search
    USPC .................. 361/301.5, 274.1, 323; 165/185; 428/323
    See application file for complete search history.

(56) References Cited

U.S. PATENT DOCUMENTS

| | | |
|---|---|---|
| 8,159,812 B2 | 4/2012 | Eriksson |
| 2007/0231560 A1* | 10/2007 | Zhang .................... F28F 13/00 428/323 |
| 2007/0254137 A1 | 11/2007 | Koppe et al. |
| 2013/0062046 A1* | 3/2013 | Izutani ................ H01L 23/3737 165/185 |
| 2013/0194712 A1* | 8/2013 | Lavene ................... H01G 4/32 361/274.1 |

* cited by examiner

A - A

B - B

METALLIZED FILM CAPACITOR ELEMENT COMPRISING THERMALLY CONDUCTIVE FILMS AND A THERMALLY CONDUCTING FILM FOR AN ELECTRICAL POWER COMPONENT

FIELD OF THE INVENTION

The present invention relates to a metallized film capacitor element including a metal coated dielectric film wound in a plurality of turns. The present invention relates in particular to dry power capacitors. The invention further relates to a thermally conducting film for electrical power components.

PRIOR ART

There are many research actives ongoing to create more environmentally friendly dry power components, i.e. power products which do not use oil as electrical insulation, such as dry capacitors, dry electrical bushings, and dry instrument transformers. Further, there is an increasing demand on removal of dissipated energy for dry high voltage components, due to increasing voltage and current levels.

A capacitor may include one or more capacitor elements connected in series or in parallel. Today, high voltage capacitor elements mostly use a film-foil technology, where a metal foil, e.g. aluminum, is wound alternating with a dielectric film, e.g. polypropylene film, into a cylindrical roll, which is then impregnated with an impregnation fluid. Due to the fact that the conductor is made of metal foil, heat is effectively removed from the center of a capacitor element. Due to the metal foil in combination with the impregnation fluid, which has the ability to circulate inside the housing, an efficient removal of dissipated energy from the capacitor is created and hotspots inside the capacitor element are reduced.

However, there is a demand due to safety, energy density, and environmental reasons to design capacitors with a "dry" technology, which means without the immersion of the capacitor in an impregnation fluid. In a dry metallized film capacitor, the conductor is made by evaporating a thin metal layer on a dielectric film to form a metallized film. The metallized film is wound in a plurality of turns into a cylindrical roll, which is embedded in an encapsulation made by a solid material, such as epoxy, polyurethane or silicone gel to form a capacitor unit. However, the thin metal layer of the metallized film is unable to effectively transport the heat out from the center of the capacitor element. Further, the solid encapsulation does not effectively transport the heat away from the capacitor. Thus, for dry capacitors, removing of dissipated energy becomes a problem, especially in high voltage AC applications.

U.S. Pat. No. 8,159,812 discloses a power capacitor including at least one capacitor element, wherein the capacitor element includes a plurality of series-connected cylindrical sub-elements, where each sub-element is formed by at least two strips of a dielectrical material wound in a plurality of turns, wherein a layer of electrically conducting material is disposed between the turns of the winding, and wherein the sub-elements are disposed concentrically around each other, one externally of the other. The sub-elements may also include tightly wound strips of metal-coated polymer film. Insulation is provided between the sub-elements.

OBJECT AND SUMMARY OF THE INVENTION

One object of the present invention is to improve the removal of dissipated energy in metallized film capacitor elements and by that reduce hotspots in the capacitor elements and allow the elements to be operated under higher electric field.

This object is achieved by the metallized film capacitor element as defined in the independent claim related to a metallized film capacitor element.

The metallized film capacitor element comprises at least two concentrically arranged cylindrical sub-elements, each sub-element including at least one metal coated dielectric film wound in a plurality of turns. The capacitor element further comprises a thermally conductive section provided between the sub-elements. The thermally conductive section comprises a thermally conductive sheet wound at least one turn and having a higher thermal conductivity than the metal coated dielectric film of the sub-elements.

The thermally conductive section provided between the sub-elements incorporates a high thermally conductive material inside the capacitor element, and thereby increases the thermal conductivity of the capacitor element and guides heat out from the center of the capacitor element to the ends faces of the capacitor element. The use of a high thermally conductive material within the capacitor element removes heat from the spot where it is dissipated. The present invention achieves an efficiently removal of dissipated energy in the capacitor element, thereby reducing hotspots inside the capacitor element, which results in increased field, higher allowed ambient temperature, higher current ratings, and larger volume/surface ratio.

A benefit achieved is an increase of power and energy densities for dry capacitor designs. The power and energy density is crucial for space limited applications. The main benefit is in high voltage DC or AC applications. However, the invention can be useful in low as well as medium voltage applications.

An advantage with this solution is that it is possible to use the same winding apparatus for winding the thermally conductive sheet and for winding metalized film of the sub-elements. The currently used winding machines can be used for manufacturing the capacitor element according to the invention. Thus, the manufacturing of the capacitor element according to the invention is easy and does not require any additional equipment.

To provide an efficient removal of dissipated energy in the capacitor element, the thermal conductivity of the thermally conductive section should preferably be larger than 0.25 W/mK, and more preferably larger than 0.3 W/mK.

According to an embodiment of the invention, the thermally conductive sheet has a thickness between 0.5 and 1000 µm, preferably between 1 and 100 µm, and most preferably between 3 and 50 µm. This embodiment ensures that it is possible to wind the thermally conductive sheet. A thinner sheet is more flexible and accordingly easier to wind.

According to an embodiment of the invention, the thermally conductive sheet is wound a plurality of turns. The number of turns affects the thermal conductivity of the capacitor element. A large number of turns increases the thermal conductivity of the capacitor element. However, a large number of turns also increases the size and cost of the capacitor. The number of turns needed depends on the amount of energy to be removed, which depends on the type of capacitor and its application, and also on the thermal conductivity of the sheet. If the thermal conductivity of the sheet is high, a few turns are sufficient to remove the dissipated energy. The thermally conductive sheet is suitably wound between 1 and 100 turns, preferably between 2 and 50 turns, and most preferably between 2 and 20 turns. A reasonable number of turns of the thin sheet do not have a major impact on design and cost of the capacitor element.

According to an embodiment of the invention, the capacitor element comprises a plurality of concentrically arranged cylindrical sub-elements and a plurality of thermally conductive sections arranged between the sub-elements at different radial distances from the center of the capacitor element. By providing a plurality of thermally conductive sections arranged at different radial distances from the center of the capacitor element, it is possible to further increase the thermal conductivity in the capacitor element and thereby to increase the removal of dissipated energy. Further, the increase of thermal conductivity in the capacitor element is more evenly distributed and heat is removed from different parts of the capacitor element. This embodiment is particularly useful for medium and high voltage capacitors, which have a large demand of removal of dissipated energy.

Preferably, the number of turns of the thermally conductive sheet in each section is between 1 and 20. This is possible to produce with current state-of-the-art winding machines.

According to an embodiment of the invention, the thermally conductive section is cylindrical and the height of the section is equal or larger than the height of the sub-elements. To be able to efficiently guide heat from the interior of the capacitor element to electrodes provided at the end faces of the capacitor element, and thereby to the surroundings of the capacitor element, the height of thermally conductive section should preferably be equal or larger than the height of the sub-elements.

According to an embodiment of the invention, the thermally conductive sheet is a metal foil, for example, aluminum or copper. Thermally conductive section is electrically insulated from the metal coated dielectric film in the surrounding sub-elements. There exist suitable metal foils on the market. A metal foil has a high thermal conductivity and is affordable. Using a metal foil, the thermally conductive section becomes electrically conductive. To make this embodiment work, the thermally conductive section thermally conductive section needs to be insulated from the surrounding metalized films, which can be done by adding a pure insulating film, like propylene.

According to an embodiment of the invention, the thermally conductive sheet is a thermally conducting film including an electrically insulating film provided with a layer of thermally conductive and electrically insulating particles disposed on at least one side of the film. Preferably, the particles should have a thermal conductivity larger than 0.25 W/mK. Due to the fact that the film and the particles are made of electrically insulating material, the thermally conductive sections becomes electrically insulating. Thus, it is not necessary to insulate the thermally conductive sections from the sub-elements, which facilitates the manufacturing of the capacitor element and accordingly reduces costs. According to this embodiment, the thermally conductive particles are placed on top of an electrically insulating film, instead of being blended with a polymer. It is difficult to disperse nano or micro particles good enough inside, for example, polypropylene, to produce good quality films thin enough to make it suitably wind. This embodiment makes it possible to provide thin films with good thermal conductivity. Preferably, the thermally conducting film has a thickness between 1 and 50 µm, and more preferably between 3 and 10 µm. A film with such thickness is possible to wind. A thinner film is more flexible and accordingly easier to wind.

According to an embodiment of the invention, the thermally conductive particles are made of a ceramic material, such as barium titanate (BaTiO3) and boron nitride (BN). Preferably, inorganic metal oxide particles should be used, such as aluminum oxide (Al2O3) and titanium dioxide (TiO2). Metal oxides are electrically insulating materials having high thermal conductivity and are well suitable in this application.

According to an embodiment of the invention, the layer of thermally conductive particles is disposed on the electrically insulating film in a thermally conducting pattern, thereby providing an electrically insulating film with high thermally conductive patterns. By a thermally conducting pattern is meant a pattern which is designed to conduct heat in at least one direction relative the film. This embodiment makes it possible to provide an uneven thermal conductivity of the thermally conducting film. The thermally conducting pattern can be designed to conduct heat in a certain desired direction relative the insulating film, for example, to conduct heat from one short side to the opposite short side of the film. By disposing the thermally conductive particles in a pattern on the film, it is possible to reduce the amount of thermally conductive material needed to remove the heat from the capacitor element, and accordingly to reduce costs.

According to an embodiment of the invention, the thermally conductive particles are disposed on the film in a pattern extending in a longitudinal direction of the cylindrical capacitor element. For example, the pattern comprises a plurality of strings extending in a direction cross a longitudinal axis of the insulating film, and by that extending in a longitudinal direction of the cylindrical capacitor element. By this arrangement, heat from the interior of the capacitor element is conducted in the longitudinal direction of the capacitor element to its end faces. Thus, it is possible to reduce the amount of high thermal material on the film, and still achieve sufficient removal of the dissipated energy.

According to an embodiment of the invention, the thickness of the layer of thermally conductive particles d is between 10 and 300 nm, preferably between 10-100 nm, and most preferably between 10-50 nm.

Another object of the present invention is to improve the thermal conductivity of electrical power components, such as, capacitors, bushings, and instrument transformers.

This object is achieved by a thermally conducting film as defined in the independent claim related to a thermally conducting film.

The thermally conducting film comprises an electrically insulating film and a layer of thermally conductive and electrically insulating particles disposed on at least one side of the film. The particles can be any thermally conductive and electrically insulating particles. Preferably, the particles have a thermal conductivity larger than 0.25 W/mK. The layer can be disposed to cover the whole side of the insulating film or to cover only a part or parts of the film.

An advantage with the thermally conducting film according to the invention is that it is not electrically conducting, and thus can be used in contact with electrically conducting parts of the power components without any need of electrical insulation to avoid short circuit. Thus, it is not necessary to insulate the thermally conductive film from the conducting parts of the power components, which facilitates the manufacturing of the capacitor element and accordingly reduces costs. Another advantage is that the thermally conducting film is flexible, and accordingly it is possible to wound it inside the component together with other wound parts of the component.

According to the invention, the thermally conductive particles are placed on top of an electrically insulating the film, instead of being blended with a polymer. It is difficult to disperse nano or micro particles good enough inside, for example polypropylene, to produce good quality films thin enough to make it flexible enough to wind. This invention makes it possible to provide thin films with good thermal conductivity.

The thermally conducting film can, for example, be used to improve the thermal conductivity of dry power components including a wound metallized dielectric film, and to improve the thermal conductivity of segments of electrical insulation material in electrical power components. The electrical insulation material is, for example, wound paper or wound dielectric film. The thermally conducting film is wound to form one or more thermally conductive sections provided between sub-elements of wound elements, such as insulation material and metallized polymer film, of the power component.

According to an embodiment of the invention, the thermally conducting film has a thickness between 1 and 50 μm, and preferably between 3 and 10 μm. A film with such thickness is possible to wind. A thinner film is more flexible and accordingly easier to wind.

According to an embodiment of the invention, the thermally conductive particles are made of a ceramic material, such as barium titanate (BaTiO3) or boron nitride (BN). Preferably, inorganic metal oxide particles should be used, such as aluminum oxide (Al2O3) or titanium dioxide (TiO2). Metal oxides are electrically insulating materials having high thermal conductivity and are well suitable in this application.

According to an embodiment of the invention, the layer of thermally conductive particles is disposed on the electrically insulating film in a thermally conductive pattern, thereby providing an electrically insulating film with high thermally conductive patterns. By a thermally conducting pattern is meant a pattern designed to conduct heat in at least one direction relative the film. This embodiment makes it possible to provide an uneven thermal conductivity of the thermally conducting film. For example, it is possible to design the pattern to conduct heat in a certain direction relative the insulating film, for example, to conduct heat from one short side to the opposite short side of the film. A thermally conducting film according to this embodiment is suitable to be used in components where it is a desire to conduct the heat in a certain direction. By disposing the thermally conductive particles in a patter on the film, it is possible to reduce the amount of thermally conductive material and still achieve sufficient removal of the dissipated energy, and accordingly reduce costs.

According to an embodiment of the invention, the thermally conducting pattern is designed to transport heat in a direction cross a longitudinal axis of the film. For example, the layer of thermally conductive particles can be disposed on the film in a pattern including strings extending cross the longitudinal direction of the film. Thus, the thermally conducting film has a higher thermal conductivity in a direction cross the longitudinal direction of the film, than in the longitudinal direction of the film. A thermally conducting film according to this embodiment is suitable to be used in components where it is a desire to conduct the heat in a direction cross the longitudinal direction of the film, such as, a capacitor element. This embodiment makes it possible to reduce the amount of high thermal material on the film, and still achieve sufficient removal of the dissipated energy.

According to an embodiment of the invention, the thickness of the said layer of thermally conductive particles is between 10 and 300 nm, preferably between 10- 100 nm, and most preferably between 10-50 nm.

The thermally conducting film can be used for improving the thermal conductivity of power components including segments of wound electrical insulation material, when the thermally conducting film is provided inside the segments of wound electrical insulation material.

The thermally conducting film can be used for improving the thermal conductivity of dry power components including segments of a wound metallized dielectric film, when the thermally conducting film is provided inside the segments of wound metallized polymer material.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
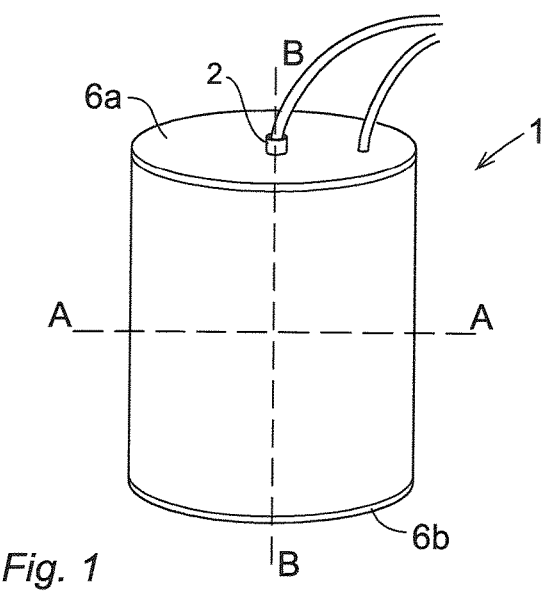
FIG. 1 shows a perspective view of a metallized capacitor element according to a first embodiment of the invention.
Figure 2:
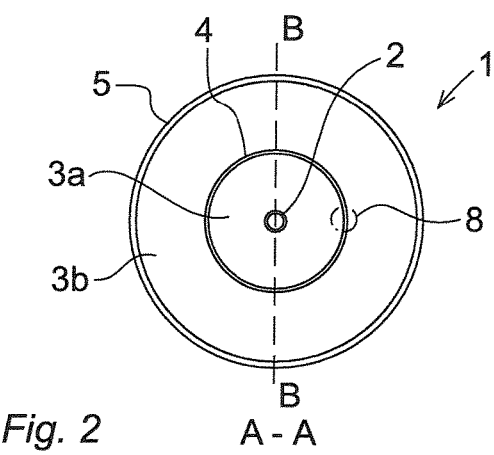
FIG. 2 shows a cross section A-A through the capacitor element shown in FIG. 1.
Figure 3:
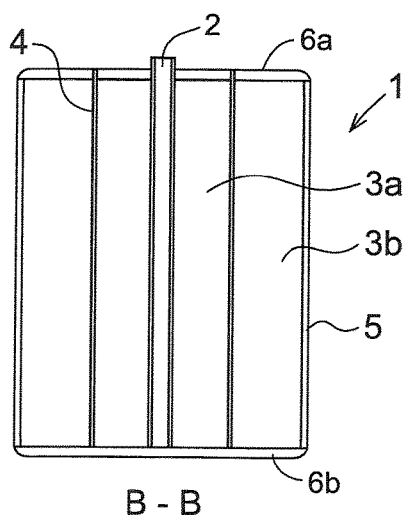
FIG. 3 shows a cross section B-B through the capacitor element shown in FIGS. 1 and 2.

A capacitor may include one or more capacitor elements connected in series or in parallel. FIG. 1 shows a perspective view of a capacitor element 1 according to a first embodiment of the invention. FIG. 2 shows a cross section A-A through the capacitor element 1 and FIG. 3 shows a cross section B-B through the capacitor element.

The capacitor element is cylindrical and comprises a winding core 2 and a plurality of cylindrical sub-elements 3a-b concentrically arranged with the winding core. The winding core 2 is, for example, a stiff polymer rod. However, cardboard, metal and ceramic winding cores can also be used. In this embodiment, the capacitor element 1 includes two concentrically arranged cylindrical sub-elements 3a, 3b. Each sub-element 3a-b includes a metallized film, in the form of a metal coated dielectric film wound in a plurality of turns. The metallized film is tightly wound to remove air. The dielectric film is preferably a polymer film, for example, made of polypropylene or polyester. The metal coating is, for example, made of aluminum, zinc, silver or combinations thereof. The metallization of the metallized film is done by means of evaporation. The metallized film may have patterns.

The metallized film of the innermost sub-element 3a is attached to the core 2, for example, by means of welding, and wound around the core. The sub-elements are connected in series or in parallel. The capacitor element further comprises an insulation section 5 of electrical insulating film made of pure polymer film, such as polypropylene or polyester, wound 1-300 turns. The capacitor element is then imbedded in an electrical insulating material forming an encapsulation surrounding the sub-elements 3a-b. The capacitor element includes an upper and a lower electrode 6a-b deposited on each end, which contacts the film of the sub-elements. In an alternative embodiment, the sub-element may include two types of metal coated polymer films.

The capacitor element 1 further comprises a thermally conductive section 4 provided between the sub-elements 3a-b. The thermally conductive section 4 includes a sheet wound one or more turns and including a thermally conducting material having a higher thermal conductivity than the metal coated polymer film of the sub-elements. Preferably, the thermal conductivity of the thermally conductive section is larger than 0.25 W/mK, and more preferably larger than 0.3 W/mK. The thermally conductive sheet has a thickness between 0.5 and 1000 µm, preferably between 1 and 100 µm, and most preferably between 3 and 50 µm, to make it possible to wind. The thickness needed depends on the material of the sheet. The thermally conductive section can be arranged as a separate ring, or alongside the metallized film.

Without the thermally conductive section, the low thermal conductivity of the metallized polymer film of the sub-elements leads to significantly higher temperature in the center of the element than at the side faces. Elevated temperatures in metallized film capacitor elements lead to premature ageing. This temperature gradient towards higher temperature in the center of the capacitor element can be reduced by introducing the thermally conductive section.

The thermally conductive sheet of the thermally conductive section is wound around the innermost sub-element 3a. The metalized film of outermost sub-element 3b is wound around the thermally conductive section 4. The thermally conductive section may include a number of turns of the thermally conductive sheet. The thermally conductive sheet can be wound between 1 and 100 turns, preferably between 2 and 50 turns, and most preferably between 2 and 20 turns. The thermally conductive sections are introduced during the winding process of capacitor element.

Figure 4A:
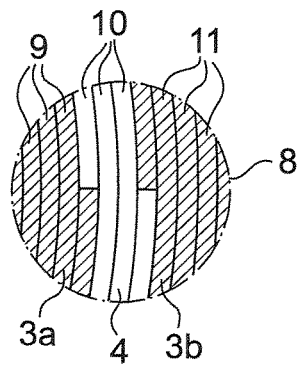
FIG. 4a shows an enlarged view of a region of the capacitor element shown in FIG. 2 including a first example of a thermally conductive section provided between two sub-elements of the capacitor element.

FIG. 4a shows an enlarged view of a region 8 of the capacitor element shown in FIG. 2 disclosing a first example the thermally conductive section 4. The innermost sub-element 3a includes a plurality of turns 9 of a metallized film, and the outermost sub-element 3b also includes a plurality of turns 11 of the metallized film. The thermally conductive section 4 provided between the two sub-elements 3a-b includes a three turns 10 of a sheet wound around the innermost sub-element 3a and having a higher thermal conductivity than the metal coated dielectric film. In this embodiment, the thermally conductive section 4 consists of the wound sheet.

Figure 4B:
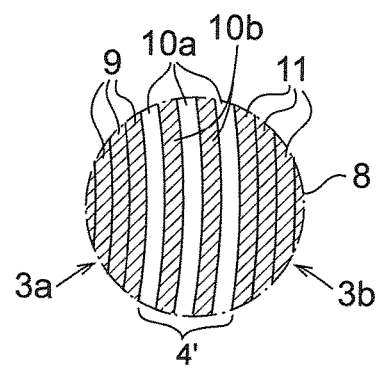
FIG. 4b shows an enlarged view of a region of the capacitor element shown in FIG. 2 including a second example of a thermally conductive section provided between two sub-elements of the capacitor element.

FIG. 4b shows an enlarged view of the region 8 of the capacitor element shown in FIG. 2, including a second example of a thermally conductive section 4' provided between two sub-elements 3a-b of the capacitor element. The sub-elements 3a-b includes a plurality of turns of a metallized film in the same way as in the embodiment shown in FIG. 4a. However, the metallized film does not end at the thermally conductive section, as shown in the embodiment in FIG. 4a. Instead the film continues through the thermally conductive section 4' and is wound together with thermally conductive sheet. Thus, the thermally conductive section 4' includes a plurality of turns 10a of the thermally conductive sheet and a plurality of turns 10b of the metalized film. If the thermally conductive sheet is a metal foil, the metal layer on the metalized film is removed, e.g. by burn out, in the thermally conductive section 4' to electrically insulate the metal foil from the sub-elements. However, if the thermally conductive sheet is electrically insulating, for example, the thermally conductive film described later, the metal layer does not have to be removed. This embodiment makes the winding easier and accordingly facilitates the manufacturing of the capacitor element.

The thermally conductive section has the shape of a hollow cylinder. The wall of the thermally conductive section has a thickness of 10 µm-5 cm. The thermally conductive section 4 extends between the sub-elements 3a-b and terminates at the end faces of the capacitor element. The thermally conductive section 4 should preferable be in line with at least one of the electrodes to transport heat out to end faces of the capacitor element. To be able to efficiently guide heat from the interior of the capacitor element to the end faces of the capacitor element, and thereby to the surroundings of the capacitor element, the height of the thermally conductive section 4 should preferably be equal or larger than the height of the sub-elements. In the embodiment shown in FIG. 3, the height of the thermally conductive section 4 is larger than the height of the sub-elements 3a-b. The thermally conductive section 4 extends outside the sub-elements 3a-b and thereby carries the heat into the encapsulation.

The number of thermally conductive sections 4 may vary between 1 and 100, but preferably between 1 and 20 in order to be economically motivated. The number of concentrically arranged cylindrical sub-elements 3a-b may also vary in dependence of the number of thermally conductive sections. Placement of the thermally conductive sections 4 inside the capacitor element can be made in different ways. In one embodiment, the thermally conductive sections 4 are evenly distribution with regard to distance from the core 2 or an equal area of the metallized film. In another embodiment, the placement of the thermally conductive sections 4 is uneven, for example, the sections are arranged closer to each other in the center of the capacitor element where they are needed.

Figure 5:
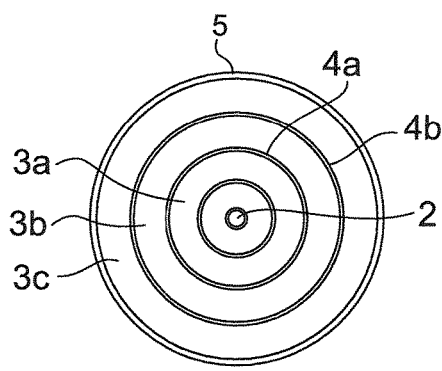
FIG. 5 shows a cross section through a capacitor element according to a second embodiment of the invention.

FIG. 5 shows a second embodiment of the capacitor element, comprising three concentrically arranged cylindrical sub-elements 3a-c, and two concentrically arranged thermally conductive sections 4a-b, extending between the sub-elements. The thermally conductive sections 4a-b are arranged radially outside each other.

In an embodiment of the invention, the thermally conductive section includes a wound metal foil. The metal foil is, for example, made of aluminum or copper. The thermal conductivity of aluminum is 237 W/mK and thermal conductivity of copper is 401 W/mK. Such metal foils are commercially available in suitable thicknesses, for example 4 um. A metal foil is electrically conductive. To make this embodiment work, the thermally conductive section needs to be insulated from the surrounding metalized films. For example, the thermally conductive section is electrically insulated from the surrounding sub-elements by means of a pure polymer film. To avoid short circuit, the metal foil cannot be attached to both the top and bottom electrode. The metal foil can be attached to one of the electrodes, the top or bottom electrode. The metal foil needs to have sufficient distance to the bottom electrode to avoid flash over. It can also be a free metal foil, i.e. not attached to any of the electrodes.

In an alternative embodiment of the invention, the material of the thermally conductive section is electrically insulating, for example, a high thermally conducting polymer. In this embodiment, the thermally conductive section can be attached to both the top and bottom electrode. It can also be a free film that is not attached to any of the electrodes.

In another embodiment of the invention, the sheet of the thermally conductive section is a thermally conducting film made of an electrically insulating film having a layer of thermally conductive and electrically insulating particles disposed on at least one side of the insulating film. Preferably, the thermal conductivity of the particles is larger than 0.25 W/mK, and more preferably larger than 0.3 W/mK. The particles can be disposed on one side of the film, or on both sides of the film. The particles can be disposed on the film by any type of printing or evaporation technique, such as inkjet printing. For example, the particles are dispersed in a solvent during production of the thermally conducting film. A printing method can be used to apply the solvent on the insulating film. When the solvent has evaporated, a percolated layer of particles is formed on the film. The layer may cover the entire insulating film or only parts of the film.

The insulating film can suitably be a polymer film, such as polypropylene, polyethylene, polyester, polyamide, polyimide or terephthalate. The insulating film can also be made of Teflon or glass. The insulating film is, for example, covered with a layer of a ceramic material. The ceramic material is, for example, a metal oxide, such as percolated inorganic metal oxide particles. Examples of suitable inorganic metal oxide particles are aluminum oxide (Al2O3) and titanium dioxide (TiO2). The thermal conductivity of aluminum oxide is 30 W/mK, which makes it very suitable in this application. Thermal conductivity of titanium dioxide vary between 2 and 12 W/mK depending on its crystal structure. Particles of other ceramic materials can also be used, for example, Boron nitride (BN), having a thermal conductivity between 3 and 700 W/mK depending on its crystal structure, and barium titanate (BaTiO3) having a thermal conductivity of 2.9 W/mK. The layer of metal oxide particles on the insulating film should be thicker than one mono layer, minimum thickness >10 nm.

In another embodiment, the insulating film is covered with a diamond-like carbon (DLC) electrically insulating coating, which has a thermal conductivity between 3.5 and 700 W/mK.

The thermally conductive particles can be disposed on the electrically insulating film in a thermally conducting pattern. The pattern can cover 0.5-99.5% of the surface area of the film. The height of the pattern can be 1-10000 nm. The pattern can be made by any thermally conductive and electrically insulating particles, such as metal oxide particles. If the pattern is made by metal oxide particles the thickness of the pattern should be larger than 10 nm. The thermally conducting film can have the same thermal conductivity in all directions on the film, or an uneven thermal conductivity, for example, more thermal conductive in one direction. The pattern can be designed to achieve uneven thermal conductivity.

Figure 6A:
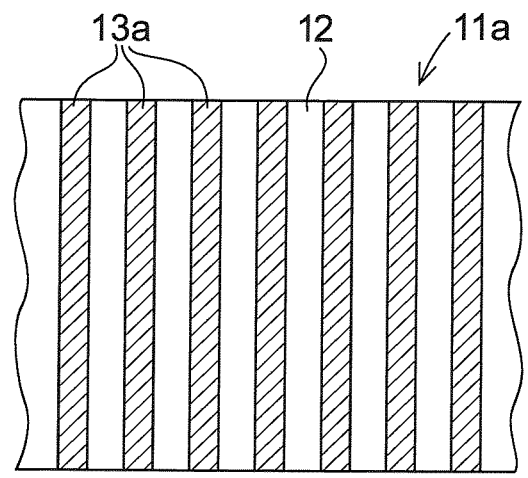
FIGS. 6a-b show examples of thermally conducting films provided with different patterns of thermally conductive particles.
Figure 6B:
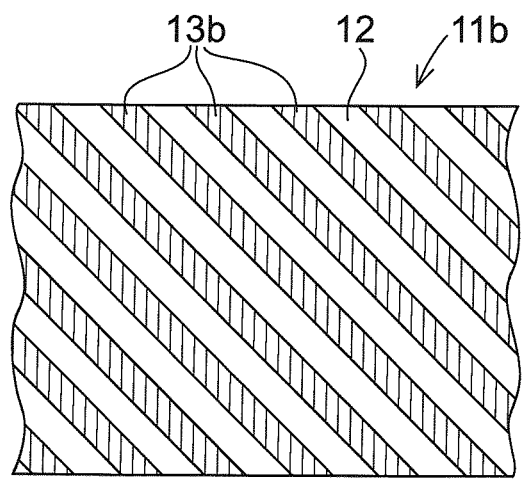

FIGS. 6a-b show examples of thermally conducting films provided with different patterns of thermally conductive particles. FIG. 6a shows a thermally conductive film 11a including an insulating film 12 and a pattern of thermally conductive particles disposed on the insulating film. The pattern includes a plurality of parallel strings 13a extending in a direction perpendicular to the longitudinal direction of the film. When the film 11a is wound around the sub-elements of the capacitor element, the strips 13a are extending in a longitudinal direction of the capacitor element and thereby increasing the conductivity in the axial direction of the capacitor element. FIG. 6b shows a thermally conductive film 11b including an insulating film 12 and a pattern 13b of thermally conductive particles disposed on the insulating film. The pattern includes a plurality of strings 13b extending in a direction angular to the longitudinal direction of the film. Both the thermally conducting patterns 13a-b are designed to transport heat in a direction cross a longitudinal axis L of the film, i.e. from one short side of the film to the opposite short side of the film.

The thermally conducting film described above can be used for other types of power components to improve the thermal conductivity of the components. The thermally conducting film is particularly useful in applications where high voltages lead to significantly increased temperatures in the center of the component compared to the outside.

The invention can be used for AC as well as DC components, and for low, medium and high voltage power components. The invention can also be used in capacitors that is not dry, such as capacitors immersed in an impregnation fluid, to improve the thermal conductivity of the capacitor.

The invention claimed is:

1. A metallized film capacitor element comprising a plurality of concentrically arranged cylindrical sub-elements electrically connected to each other, each sub-element including at least one metallized film, in the form of a metal coated dielectric film, wound in a plurality of turns, wherein that the capacitor element further comprises at least one thermally conductive section provided between the sub-elements, the thermally conductive section including a sheet wound at least one turn and having a higher thermal conductivity than the metallized film of the sub-elements.

2. The capacitor element according to claim 1, wherein the thermal conductivity of the thermally conductive section is a larger than 0.25 W/mK.

3. The capacitor element according to claim 1, wherein said sheet has a thickness between 0.5 and 1000 μm.

4. The capacitor element according to claim 1, wherein said sheet is wound a plurality of turns.

5. The capacitor element according to claim 1, wherein said sheet is wound between 1 and 100 turns.

6. The capacitor element according to claim 1, wherein the capacitor element comprises at least three concentrically arranged cylindrical sub-elements and at least two thermally conductive sections provided between the sub-elements at different radial distances.

7. The capacitor element according to claim 1, wherein the thermally conductive section is cylindrical and the height of the thermally conductive section is equal or larger than the height of the sub-elements.

8. The capacitor element according to claim 1, wherein the metal coated dielectric film is a dielectric film coated with metal, said sheet is a metal foil, and the dielectric film continues through the thermally conductive section and is wound together with the metal foil to form the thermally conductive section such that the thermally conductive section is electrically insulated from the metal coated dielectric film in the surrounding sub-elements.

9. The capacitor element according to claim 1, wherein said sheet is a thermally conducting film comprising an electrically insulating film having a layer of thermally conductive and electrically insulating particles disposed on at least one side of the electrically insulating film, and wherein the metal coated dielectric film continues through the thermally conductive section and is wound together with the thermally conducting film.

10. The capacitor element according to claim 9, wherein said thermally conductive particles are made of a ceramic material.

11. The capacitor element according to claim 9, wherein the thickness of said layer of thermally conductive particles is between 10 and 300nm.

12. The capacitor element according to claim 9, wherein said layer of thermally conductive particles is disposed on the insulating film in a thermally conducting pattern.

13. The capacitor element according to claim 12, wherein said thermally conducting pattern is designed to transport heat in an axial direction of the capacitor element.

14. The capacitor element according to claim 1, wherein the metallized film capacitor element is a dry metallized film capacitor element.

15. A thermally conducting film for improving the thermal conductivity of electrical power components, wherein the thermally conducting film comprises an electrically insulating film and a layer of thermally conductive and electrically insulating particles disposed on at least one side of the electrically insulating film, wherein the layer of thermally conductive and electrically insulating particles in a thermally conducting pattern that extends in a direction non-parallel and non-perpendicular to a longitudinal direction of the thermally conducting film.

16. The thermally conducting film according to claim 15, wherein the thermal conductivity of said particles is larger than 0.25 W/mK.

17. The thermally conducting film according to claim 15, wherein the thickness of the thermally conducting film is between 1 and 50 μm.

18. The thermally conducting film according to claim 15, wherein the thickness of said layer of thermally conductive particles is between 10 and 300nm.

19. The thermally conducting film according to claim 15, wherein said thermally conductive particles are made of a ceramic material.

20. The thermally conducting film according to claim 15, wherein said thermally conductive particles are made of metal oxide.

* * * * *